(12) United States Patent
Yoshida et al.

(10) Patent No.: US 11,199,622 B2
(45) Date of Patent: Dec. 14, 2021

(54) DISTANCE MEASUREMENT APPARATUS

(71) Applicants: Kabushiki Kaisha Toshiba, Tokyo (JP); Toshiba Electronic Devices & Storage Corporation, Tokyo (JP)

(72) Inventors: Hiroshi Yoshida, Kanagawa (JP); Shoji Ootaka, Kanagawa (JP); Katsuya Nonin, Kanagawa (JP); Masaki Nishikawa, Kanagawa (JP); Masayoshi Oshiro, Tokyo (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

(21) Appl. No.: 17/003,082

(22) Filed: Aug. 26, 2020

(65) Prior Publication Data
US 2021/0270956 A1 Sep. 2, 2021

(30) Foreign Application Priority Data
Feb. 28, 2020 (JP) .............................. JP2020-032708

(51) Int. Cl.
| | |
|---|---|
| *G01S 13/84* | (2006.01) |
| *B60R 25/20* | (2013.01) |
| *G07C 9/00* | (2020.01) |
| *G01S 13/36* | (2006.01) |
| *G01S 17/32* | (2020.01) |

(52) U.S. Cl.
CPC .............. *G01S 13/84* (2013.01); *B60R 25/20* (2013.01); *G01S 13/36* (2013.01); *G01S 17/32* (2013.01); *G07C 9/00309* (2013.01); *G07C 2009/00984* (2013.01); *G07C 2209/63* (2013.01)

(58) Field of Classification Search
CPC ......... B60R 25/20; G01S 13/36; G01S 17/32; G01S 13/84; G07C 9/00309; G07C 2009/00984; G07C 2209/63
See application file for complete search history.

(56) References Cited

U.S. PATENT DOCUMENTS

| | | | | |
|---|---|---|---|---|
| 9,965,912 B2 * | 5/2018 | Yamamoto | .............. | B60R 25/24 |
| 2007/0085657 A1 * | 4/2007 | Ogino | .................... | B60R 25/24 |
| | | | | 340/5.64 |

(Continued)

FOREIGN PATENT DOCUMENTS

| | | |
|---|---|---|
| JP | 2007-107249 A | 4/2007 |
| JP | 2012-051421 A | 3/2012 |

(Continued)

*Primary Examiner* — Thomas D Alunkal
(74) *Attorney, Agent, or Firm* — Allen & Overy LLP (57) ABSTRACT

A distance measurement apparatus of an embodiment includes a first device provided in a vehicle and a second device provided in a key-fob, and calculates a distance between the vehicle and the key-fob based on carrier phase detection. In at least one of the first device and the second device, transmission powers at which a plurality of first distance measurement signals are respectively transmitted when the key-fob is inside the vehicle are set to be lower than transmission powers at which a plurality of first distance measurement signals are respectively transmitted when the key-fob is outside the vehicle.

5 Claims, 9 Drawing Sheets

(56) References Cited

U.S. PATENT DOCUMENTS

| | | | | |
|---|---|---|---|---|
| 2012/0006611 A1* | 1/2012 | Wallace | ............... | H04M 1/67 |
| | | | | 180/272 |
| 2015/0074805 A1* | 3/2015 | Choi | ............... | H04L 63/0853 |
| | | | | 726/22 |
| 2018/0370487 A1* | 12/2018 | Ishikawa | ............... | B60R 25/10 |
| 2019/0005753 A1* | 1/2019 | Leconte | ............... | B60R 25/245 |

FOREIGN PATENT DOCUMENTS

| | | |
|---|---|---|
| JP | 2017-025599 A | 2/2017 |
| JP | 6323298 B2 | 5/2018 |
| JP | 6409756 B2 | 10/2018 |

\* cited by examiner

DISTANCE MEASUREMENT APPARATUS

CROSS-REFERENCE TO RELATED APPLICATION

This application is based upon and claims the benefit of priority from the prior Japanese Patent Application No. 2020-32708 filed in Japan on Feb. 28, 2020; the entire contents of which are incorporated herein by reference.

FIELD

Embodiments described herein relate to a distance measurement apparatus.

BACKGROUND

In recent years, a keyless entry system for facilitating locking and unlocking of a door has been adopted in many automobiles. Such a technique enables a user of an automobile to lock and unlock a door using communication between a key-fob of the automobile and the automobile. Further, in recent years, a smart key system capable of locking and unlocking a door and starting up an engine without a user touching a key-fob has widely spread.

On the other hand, cases where an attacker makes unauthorized entry into a communication between a key-fob and an automobile and steals the automobile or goods in the automobile has frequently occur. There has been a discussion on how to implement a preventive measure against such an attack, i.e., a so-called relay attack. According to the preventive measures, a distance between the key-fob and the automobile is measured and unlocking of the door can be prohibited when it is judged that the distance is a predetermined distance or more.

At the time of starting up the engine, communication is also performed between an antenna inside the automobile and the key-fob. When authentication is correctly performed, the user can start up the engine. However, the relay attack is also performed when the engine is started up.

However, an accuracy of a distance to be measured degrades due to an influence of a multi-path inside the automobile. Due to a degradation in the distance measurement accuracy, a measure against the relay attack cannot be appropriately taken, thus starting the engine may be made possible.

DETAILED DESCRIPTION

A distance measurement apparatus according to an embodiment, which calculates a distance between a vehicle and a key-fob based on carrier phase detection, includes a calculation unit configured to calculate, based on phase information acquired by a first device and a second device at least one of which is movable, a distance between the first device and the second device, in which the first device provided in the vehicle includes a first reference signal source, and a first transmitter/receiver configured to transmit a plurality of first distance measurement signals, respectively, as carrier signals and receive a plurality of second distance measurement signals from the second device, respectively, as carrier signals, using an output of the first reference signal source, and the second device provided in the key-fob includes a second reference signal source configured to operate independently of the first reference signal source, and a second transmitter/receiver configured to transmit the plurality of second distance measurement signals and receive the plurality of first distance measurement signals using an output of the second reference signal source. The calculation unit calculates the distance using a detection result of respective phases of the carrier signals obtained by receiving each of the plurality of first distance measurement signals and each of the plurality of second distance measurement signals. A second transmission power at which the plurality of first distance measurement signals or the plurality of second distance measurement signals are respectively transmitted when the key-fob is inside the vehicle is set to be lower than a first transmission power at which the plurality of first distance measurement signals or the plurality of second distance measurement signals are respectively transmitted when the key-fob is outside the vehicle in at least one of the first device and the second device.

Embodiments will be described below with reference to the drawings.

First Embodiment (Configuration)

Figure 1:
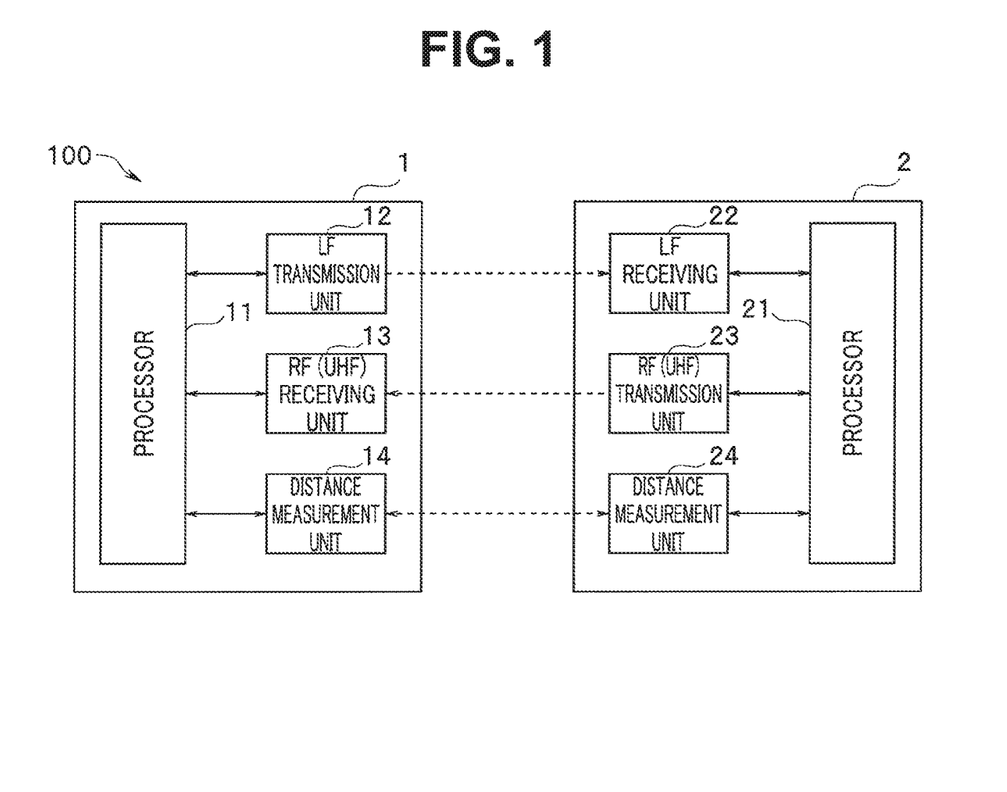
FIG. 1 is a configuration diagram of a wireless communication system including a distance measurement apparatus according to a first embodiment.
Figure 2:
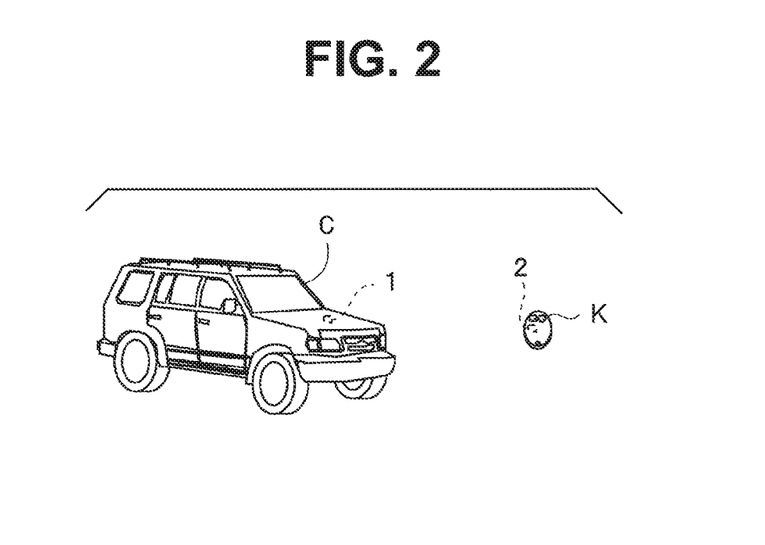
FIG. 2 is a configuration diagram for describing a smart key system to which the wireless communication system according to the first embodiment is applied.

FIG. 1 is a configuration diagram of a wireless communication system including a distance measurement apparatus according to the present embodiment. FIG. 2 is a configuration diagram for describing a smart key system to which the wireless communication system according to the present embodiment is applied. At least one of a device 1 and a device 2 is movable.

A smart key system 100 includes an automobile C as a vehicle and a key-fob K. The key-fob K is used to lock and unlock a door of the automobile C and start up an engine. More specifically, the smart key system 100 performs wireless communication according to a predetermined protocol between the device 1 loaded into the automobile C and the device 2 contained in the key-fob K, to enable the door to be locked, or the like, when the key-fob K is correctly authenticated in the automobile. In the smart key system 100, a distance between the device 1 and the device 2 is calculated based on carrier phase detection, as described below.

When the door of the automobile C has been locked and the key-fob K is outside the automobile C, if the distance between the device 1 and the device 2 is within a predetermined distance D1, the locking of the door is released when a user's hand touches a handle of the door so that a user can open the door and enter the automobile C.

When the engine has been stopped and the key-fob K is inside the automobile C, if the distance between the device 1 and the device 2 is within a predetermined distance D2, the engine is started up when an engine start button is pressed.

When the user enters an LF (low frequency) area as an area where an LF signal of the device 1 loaded into the automobile C can be received, authentication is performed.

As illustrated in FIG. 1, the device 1 provided in the automobile C includes a processor 11, an LF transmission unit 12, an RF (radio frequency) receiving unit 13, and a distance measurement unit 14. The device 2 provided in the key-fob K includes a processor 21, an LF receiving unit 22, an RF transmission unit 23, and a distance measurement unit 24. The processor 11 monitors and controls respective operations of the LF transmission unit 12, the RF receiving unit 13, and the distance measurement unit 14. Similarly, the processor 21 monitors and controls respective operations of the LF receiving unit 22, the RF transmission unit 23, and the distance measurement unit 24.

A plurality of antennas for the LF transmission unit 12 are loaded into the automobile C. The plurality of antennas include a plurality of LF transmission antennas for transmitting an LF signal LF1 to the outside of the automobile and a plurality of LF transmission antennas for transmitting an LF signal LF2 to the inside of the automobile.

The LF signal is a beacon signal as a radio signal in a 130 KHz band, for example. The LF signal includes LF identification code information for identifying the LF signal LF1 for vehicle outside and the LF signal LF2 for vehicle inside, for example. When receiving the LF signal, the device 2 can judge whether received LF signal is the LF signal LF1 or the LF signal LF2 signal based on the LF identification code information.

The device 2 contained in the key-fob K transmits key-fob identification code information in response to the receiving of the LF signal. The device 1 preforms authentication based on the received key-fob identification code information. A radio signal in a UHF band, e.g., a 300 MHz band is used to transmit the key-fob identification code information for the authentication. When authenticated, the device 1 and the device 2 each perform distance measurement processing so that the distance between the device 1 and the device 2 is measured.

Figure 3:
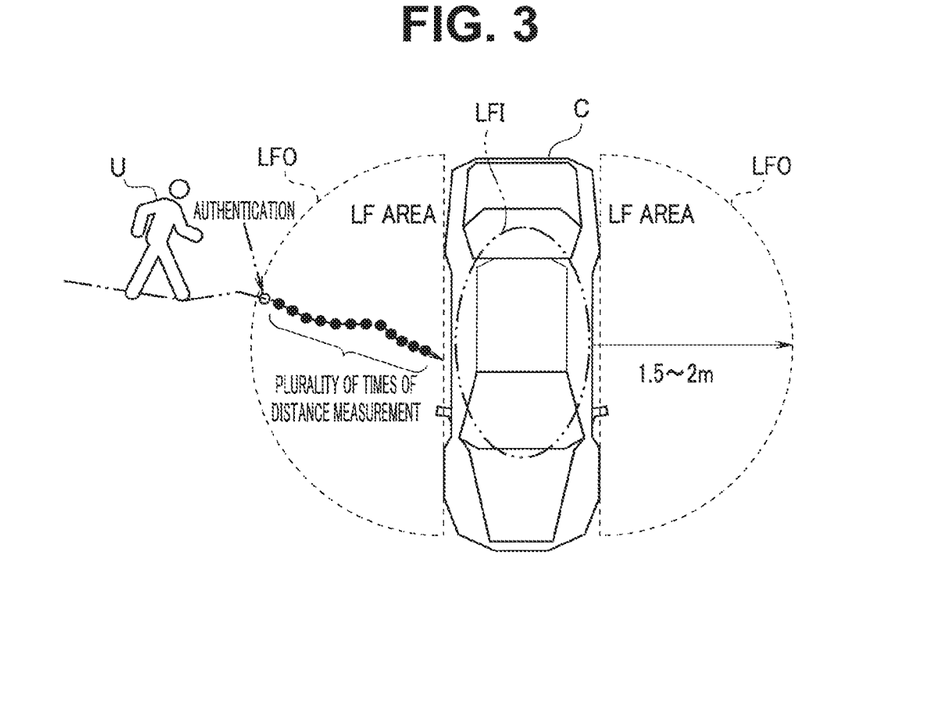
FIG. 3 is a diagram for describing how authentication and distance measurement are performed when a user who holds a key-fob has approached a vicinity of an automobile according to the first embodiment.

FIG. 3 is a diagram for describing how authentication and distance measurement are performed when a user U who holds the key-fob K has been approaching a vicinity of the automobile C. In FIG. 3, a range indicated by a dotted line represents an LF area LFO outside the automobile C. The LF area LFO is a range that the LF signal LF1 reaches from an LF transmission antenna for vehicle outside and an area within 1.5 meters to 2 meters from a center of a side surface of the automobile C, for example. When the device 2 held by the user U enters the LF area, after authentication, two or more distance measurement signals as carrier signals are transmitted and received a plurality of times between the device 1 and the device 2 and distance measurement is performed a plurality of times. Each of the distance measurement signals as the carrier signals is an unmodulated continuous wave (CW). Note that the distance measurement may be performed once, although performed a plurality of times here. The distance measurement signal is a carrier signal in a sub-gigahertz band, e.g., a 920 MHz band.

In FIG. 3, a range indicated by a two-dot and dash line represents an LF area LF1 inside the automobile C. The LF area LF1 is a range that the LF signal LF2 reaches from a transmission antenna for vehicle inside.

Figure 4:
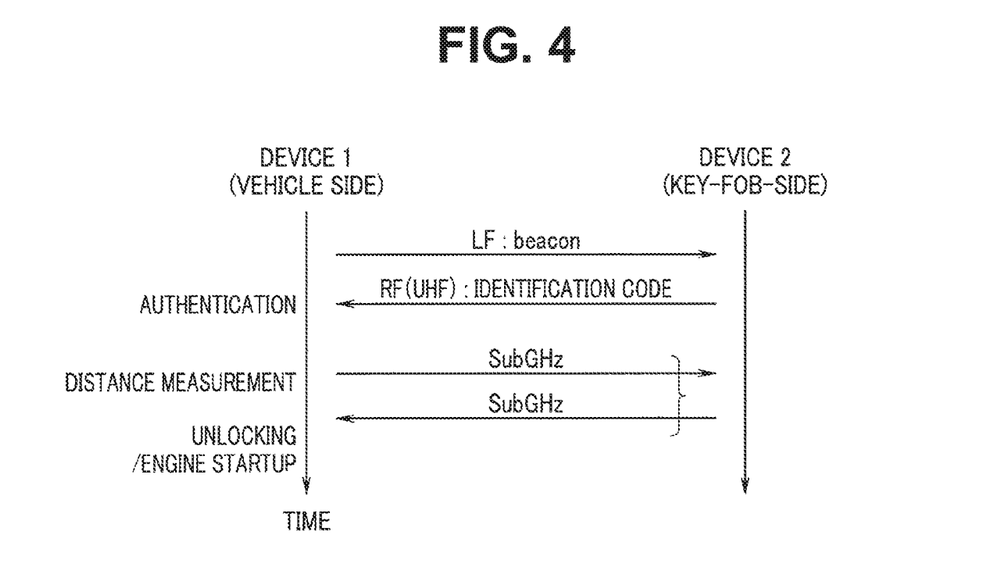
FIG. 4 is a diagram illustrating a transmission/reception sequence of a wireless signal performed between a device in the automobile and a device in the key-fob according to the first embodiment.

FIG. 4 is a diagram illustrating a transmission/reception sequence of a wireless signal performed between the device 1 in the automobile C and the device 2 in the key-fob K.

The device 1 always intermittently transmits the LF signal LF1 from the LF transmission unit 12 when the door of the automobile C is locked. Since the LF signal LF1 is a signal that reaches only in the LF area LFO, the LF receiving unit 22 in the device 2 can receive the LF signal LF1 only when the device 2 is within the LF area LFO.

The device 2, in response to the receiving of the LF signal LF1, transmits the key-fob identification code information, i.e., ID information of the key-fob K from the RF transmission unit 23, and enters a state of waiting for distance measurement signals (hereinafter also referred to as first distance measurement signals) from the device 1. When the RF receiving unit 13 in the device 1 receives the identification code information, the processor 11 performs authentication based on the received identification code information. When correctly authenticated based on the received identification code information, the processor 11 transmits the first distance measurement signals. Then, distance measurement signals (hereinafter also referred to as second distance measurement signals) are also transmitted from the device 2, and the first and second distance measurement signals are also transmitted and received so that the distance between the device 1 and the device 2 is measured.

The distance between the device 1 and the device 2 is measured using a method as disclosed in Japanese Patent Application Laid-Open Publication No. 2018-155724. The distance between the device 1 and the device 2 is calculated based on respective phases of the distance measurement signals calculated in each of the device 1 and the device 2. According to the method disclosed in Japanese Patent Application Laid-Open Publication No. 2018-155724, a device 1 transmits two or more (here, two) carrier signals as first distance measurement signals, and a device 2 transmits two or more (here, two) carrier signals as second distance measurement signals. The device 2 detects a phase difference between the received two carrier signals as the first distance measurement signals, and the device 1 detects a phase difference between the received two carrier signals as the second distance measurement signals. Information about a difference between two phases detected by the device 2, i.e., phase difference information is transmitted to the device 1, and the device 1 calculates the distance between the device 1 and the device 2 based on the phase difference detected by the device 1 and the phase difference detected by the device 2 using a predetermined calculation.

Note that the device 2 may transmit information about the respective phases of the received two carrier signals to the device 1, and the device 1 may calculate a phase difference between the received two carrier signals in the device 2 based on information about the two phases received from the device 2.

The device 1 can judge the presence of a relay attack based on the calculated distance (hereinafter referred to as a measured distance) Rm between the device 1 and the device 2. When the measured distance Rm is a predetermined distance D1, e.g., 2 meters or more, a relay attack may be possibly performed. Accordingly, the processor 11 does not output a signal for permitting the automobile C to unlock the door, for example. When the measured distance Rm is less than the predetermined distance D1, the key-fob K is within the predetermined distance D1 from the automobile C. Accordingly, the processor 11 outputs a signal for permitting the automobile C to unlock the door, for example. Upon receiving the permission signal, a device for controlling unlocking of the door of the automobile C outputs a control signal for unlocking the door when a human hand touches the door.

When the user who has the key-fob K is inside the automobile, the LF signal LF2 is transmitted from the transmission antenna for vehicle inside, and authentication is performed based on the key-fob identification code information in a similar manner to above between the device 1 and the device 2. For example, after the door is unlocked, the LF signal LF2 is intermittently transmitted from the transmission antenna for vehicle inside at predetermined time intervals. After the authentication, the distance measurement signals are transmitted and received between the device 1 and the device 2 a plurality of times so that the distance between the device 1 and the device 2 is measured. When the measured distance Rm is a predetermined distance D2 or more, a relay attack may be possibly performed. Accordingly, the processor 11 does not output a signal for permitting the automobile C to start up the engine, for example. When the measured distance Rm is less than the predetermined distance D2, the key-fob K is within the predetermined distance D2 from the automobile C. Accordingly, the processor 11 outputs a signal for permitting the automobile C to start up the engine, for example. Upon receiving the permission signal, a device for controlling the engine of the automobile C outputs a control signal for starting up the engine when an engine start button is pressed.

The processor 11 in the device 1 includes a central processing unit (hereinafter referred to as a CPU), a ROM, a RAM, and the like, and the ROM stores software programs that control respective operations of the LF transmission unit 12, the RF receiving unit 13, and the distance measurement unit 14. The processor 11 further performs a phase difference calculation based on the received second distance measurement signals in the distance measurement unit 14. Further, the processor 11 calculates a measured distance Rm using a phase difference obtained by the phase difference operation and the difference between the two phases included in the phase difference information received from the device 2, and performs a predetermined calculation based on the calculated measured distance Rm. The predetermined operation is output of the above-described signal for permitting the unlocking of the door when the LF signal LF1 has been authenticated, and is output of the above-described signal for permitting the startup of the engine when the LF signal LF2 has been authenticated.

The processor 21 in the device 2 includes a CPU, a ROM, a RAM, and the like, and the ROM stores software programs that control respective operations of the LF receiving unit 22, the RF transmission unit 23, and the distance measurement unit 24. The processor 21 further detects, i.e., measures phases based on the received first distance measurement signals in the distance measurement unit 24, calculates a difference between the detected two phases, and transmits phase difference information.

Note that although each of the processors 11 and 21 includes the CPU, the ROM, and the like for executing software programs that respectively implement each of functions, the processor may include an electronic circuit such as a semiconductor device or an FPGA (field programmable gate array) and implement the functions using the circuit or the like.

Figure 5:
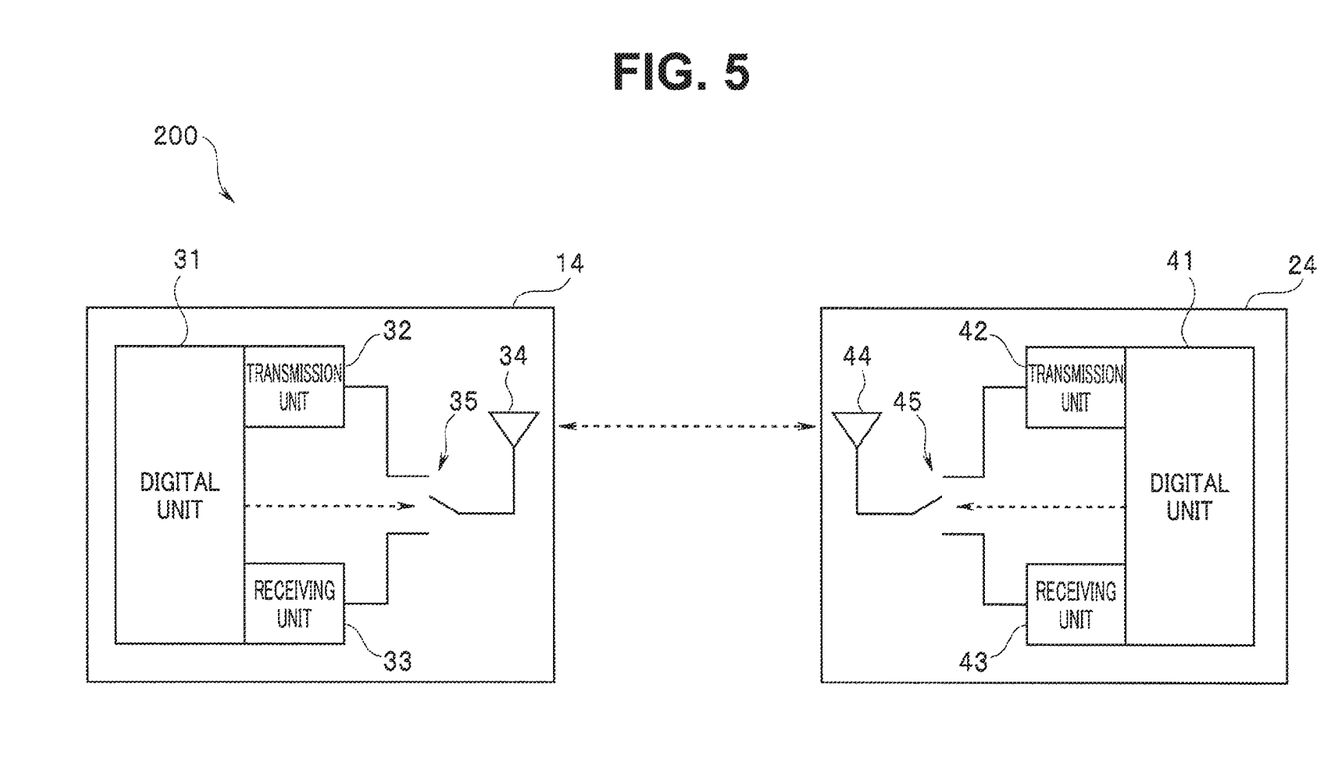
FIG. 5 is a configuration diagram of a distance measurement apparatus according to the first embodiment.

FIG. 5 is a configuration diagram of a distance measurement apparatus according to the present embodiment. A distance measurement apparatus 200 includes the distance measurement units 14 and 24, and calculates the distance between the device 1 and the device 2 based on carrier phase detection. At least one of the device 1 and the device 2 is movable. The distance measurement unit 14 is included in the device 1, and includes a digital unit 31, a transmission unit 32, a receiving unit 33, an antenna 34, and an antenna switch 35. The digital unit 31, the transmission unit 32, the receiving unit 33, and the antenna switch 35 are configured as one or two or more semiconductor devices.

The distance measurement unit 24 is included in the device 2, and includes a digital unit 41, a transmission unit 42, a receiving unit 43, an antenna 44, and an antenna switch 45. The digital unit 41, the transmission unit 42, the receiving unit 43, and the antenna switch 45 are configured as one or two or more semiconductor devices.

The digital unit 31 in the device 1 controls the transmission unit 32, the receiving unit 33, and the antenna switch 35 in response to a control signal from the processor 11. The digital unit 41 in the device 2 controls the transmission unit 42, the receiving unit 43, and the antenna switch 45 according to a control signal from the processor 21.

Figure 6:
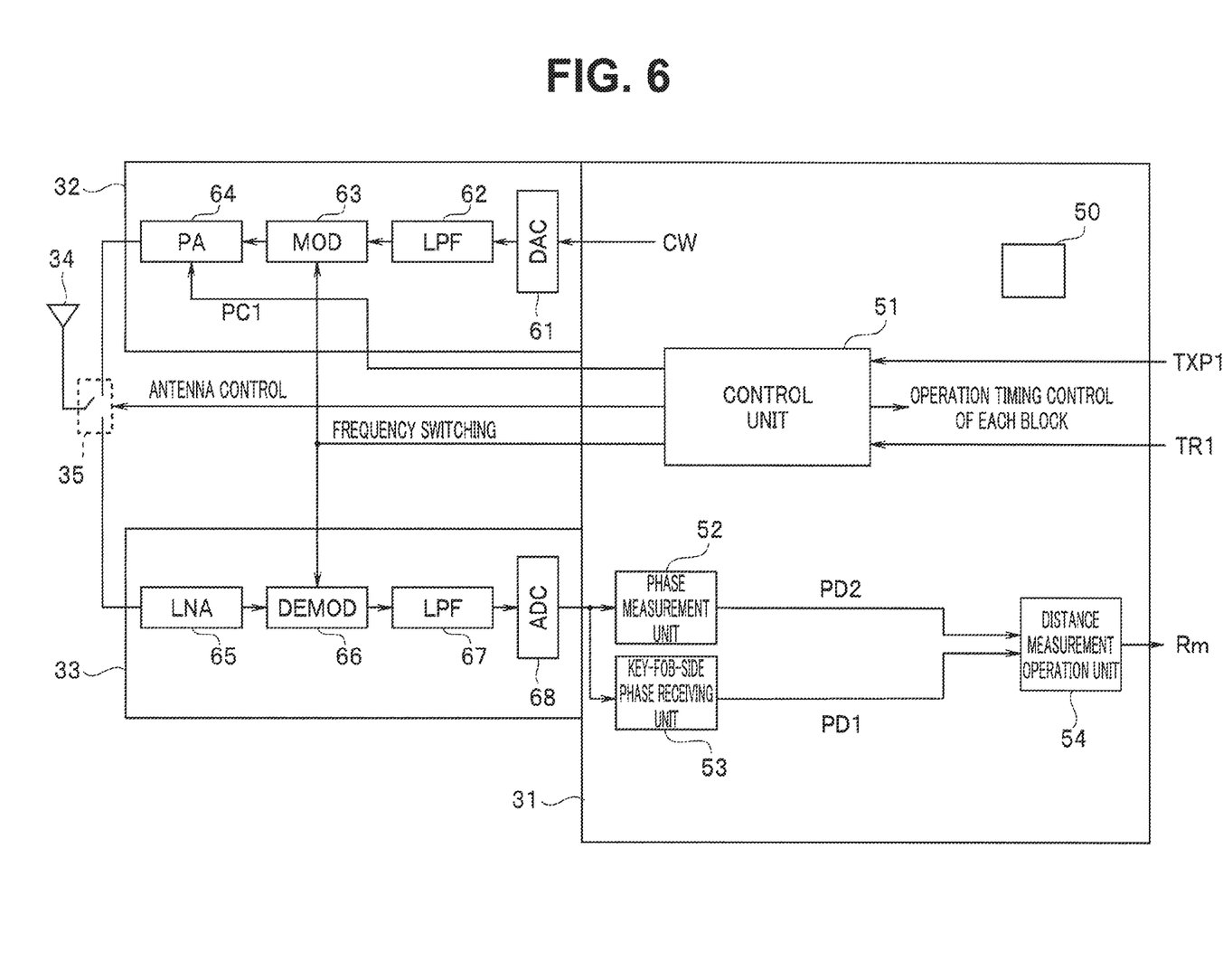
FIG. 6 is a circuit diagram of a distance measurement unit in one of the two devices according to the first embodiment.

FIG. 6 is a circuit diagram of the distance measurement unit 14 in the device 1. The digital unit 31 is composed of a digital circuit on the semiconductor device, for example. The digital unit 31 includes a reference oscillator 50, a control unit 51, a phase measurement unit 52, a key-fob-side phase receiving unit 53, and a distance measurement operation unit 54.

The reference oscillator 50 is a reference signal source configured to generate a basic clock signal of an operation within the distance measurement unit 14. Upon receiving a command signal (hereinafter referred to as a distance measurement start trigger signal) TR1 as a trigger of a distance measurement start from the processor 11, the control unit 51 controls an operation timing of each of blocks such as the phase measurement unit 52 to perform an operation of a predetermined distance measurement sequence.

The phase measurement unit 52 measures a phase of each of the second distance measurement signals (second carrier signals) from the device 2, and calculates a phase difference PD2 between the two second distance measurement signals. The phase measurement unit 52 is a circuit configured to measure respective two phases of the two second distance measurement signals received in the receiving unit 33 from the device 2, calculate a phase difference PD2 between the two phases, and output the calculated phase difference PD2 to the distance measurement operation unit 54.

The key-fob-side phase receiving unit 53 is a circuit configured to receive phase difference information of the two second distance measurement signals, which have been measured in the device 2, received from the device 2.

The distance measurement operation unit 54 calculates the distance between the device 1 and the device 2 based on a phase difference PD2 between the two second distance measurement signals respectively having frequencies f1 and f2, received by the device 1, and a phase difference PD1 received from the device 2. Therefore, the distance measurement operation unit 54 constitutes a calculation unit configured to calculate the distance between the device 1 and the device 2 based on phase information (here, two phase difference information) respectively acquired by the device 1 and the device 2. The distance measurement operation unit 54 calculates the distance using a detection result of respective phases of the carrier signals obtained by receiving the plurality of first distance measurement signals and the plurality of second distance measurement signals. Particularly, the distance measurement operation unit 54 calculates the distance using the phase difference PD2 between the second distance measurement signal having the frequency f1 and the second distance measurement signal having the frequency f2 that have been measured in the phase measurement unit 52 and the phase difference PD1 between the first distance measurement signal having the frequency f1 and the first distance measurement signal having the frequency f2 that have been measured in a phase measurement unit 72 (FIG. 7), described below, and outputs the calculated distance to the processor 11.

In other words, the distance measurement operation unit 54 performs distance measurement using the two phase differences PD1 and PD2, respectively, which are calculated based on 4 distance measurement signals respectively having the frequencies f1 and f2. In other words, the distance measurement operation unit 54 calculates the distance using the phase difference PD2 between the two second distance measurement signals respectively having the frequencies f1 and f2 received by the distance measurement unit 14 in the device 1 and the phase difference PD1 between the two first distance measurement signals respectively having the frequencies f1 and f2 received by the distance measurement unit 24 in the device 2.

Next, the transmission unit 32 will be described. The digital unit 31 generates data of the unmodulated signal (CW) based on the reference oscillator 50, and outputs the generated data to the transmission unit 32.

The transmission unit 32 is an analog circuit including a digital/analog converter (hereinafter abbreviated as a DAC) 61, a low-pass filter (hereinafter abbreviated as an LPF) 62, a modulator (MOD) 63, and an amplifier 64.

The DAC 61 receives digital data for the continuous wave (CW) from the digital unit 31, and converts the received digital data into an analog signal. Therefore, the digital unit 31 generates the digital data for the continuous wave (CW).

The analog signal from the DAC 61 is inputted to the modulator 63 after passing through the LPF 62. The modulator 63 frequency-modulates an output signal of the LPF 62 according to a frequency switching signal from the control unit 51. The analog signal from the LPF 62 is modulated into either one of the above-described frequencies f1 and f2.

The modulator 63 modulates an input signal according to the frequency switching signal from the control unit 51, and generates a signal having either one of the frequencies f1 and f2.

The amplifier 64 is a power amplifier, and amplifies an output signal of the modulator 63 and feeds the amplified output signal to the antenna 34 via the antenna switch 35. The amplifier 64 is connected to the control unit 51, and can change an amplification factor according to a power control signal PC1 from the control unit 51. The control unit 51 reduces the amplification factor of the amplifier 64 and reduces respective output powers of the first distance measurement signals as the first carrier signals transmitted from the device 1, under a predetermined condition, described below.

The antenna switch 35 operates to connect the antenna 34 to the transmission unit 32 or the receiving unit 33 according to an antenna control signal from the control unit 51.

Next, the receiving unit 33 will be described. The receiving unit 33 is an analog circuit including a low-noise amplifier (hereinafter abbreviated as an LNA) 65, a demodulator (DEMOD) 66, an LPF 67, and an analog-to-digital converter (hereinafter abbreviated as an ADC) 68.

The LNA 65 amplifies a received signal from the antenna 34 received via the antenna switch 35, and outputs the amplified received signal to the demodulator 66. The demodulator 66 demodulates an output signal of the LNA 65 according to the frequency switching signal from the control unit 51, and outputs a baseband signal.

An output signal of the demodulator 66 is fed to the ADC 68 via the LPF 67. The ADC 68 converts an output signal of the LPF 67 into a digital signal, and outputs the digital signal to the digital unit 31.

As described above, the transmission unit 32 and the receiving unit 33 constitute a first transmitter/receiver configured to transmit the two first distance measurement signals as the two first carrier signals respectively having the different frequencies (f1 and f2) and receive the two second distance measurement signals as the two second carrier signals respectively having the same frequencies as the frequencies of the two first carrier signals from the device 2 using an output of the reference oscillator 50.

Figure 7:
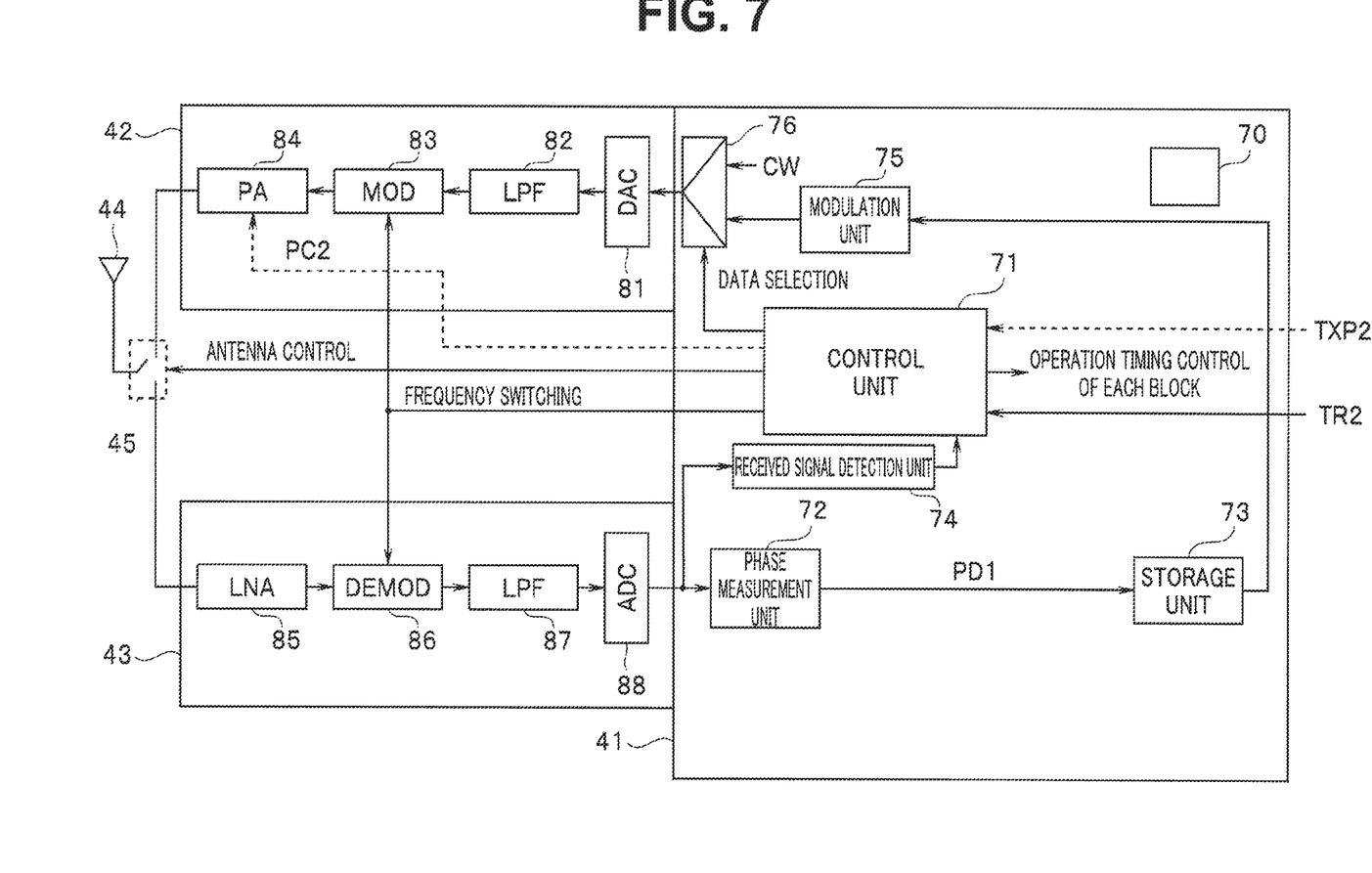
FIG. 7 is a circuit diagram of a distance measurement unit in the other of the two devices according to the first embodiment.

FIG. 7 is a circuit diagram of the distance measurement unit 24 in the device 2. The digital unit 41 is composed of a digital circuit on the semiconductor device, for example. The digital unit 41 includes a reference oscillator 70, a control unit 71, the phase measurement unit 72, a storage unit 73, a received signal detection unit 74, a modulation unit 75, and a selector 76.

The reference oscillator 70 is a reference signal source configured to generate a basic clock signal of an operation within the distance measurement unit 24. The reference oscillator 70 operates independently of the reference oscillator 50 in the device 1. Upon receiving a distance measurement start trigger signal TR2 from the processor 21, the control unit 71 controls an operation timing of each of blocks such as the phase measurement unit 72 to perform an operation of a predetermined distance measurement sequence. The processor 21 transmits key-fob identification code information, and then outputs the distance measurement start trigger signal TR2 to the control unit 71 in the distance measurement unit 24.

The phase measurement unit 72 measures a phase of each of the first distance measurement signals (first carrier signals) from the device 1, and calculates a phase difference PD1 between the two first distance measurement signals. The phase measurement unit 72 is a circuit configured to measure respective phases of the two first distance measurement signals from the device 1 that have been received in the receiving unit 43, calculate the phase difference PD1 between the two phases, and output the calculated phase difference PD1 to the storage unit 73. Information about the measured phase difference PD1 between the two first distance measurement signals is stored in the storage unit 73.

The storage unit 73 is a register storing the information about the phase difference PD1 between the two carrier signals, as described above.

The received signal detection unit 74 detects receiving of first of the first distance measurement signal from the device 1. Upon receiving the first of the first distance measurement signal, the received signal detection unit 74 notifies the control unit 71 that the first of the first distance measurement signal has been received.

The modulation unit 75 modulates the information about the phase difference PD1 into a signal for transmitting the information. The information about the phase difference PD1 is modulated into an IQ signal corresponding to digital data of the information. The information about the phase difference PD1, which has been measured in the distance measurement unit 24, is transmitted to the distance measurement unit 14 in the device 1.

The selector 76 selects data of the continuous wave (CW) based on the reference oscillator 70 or an output signal of the modulation unit 75 according to a data selection signal from the control unit 71, and outputs the data or the output signal to the transmission unit 42.

Upon receiving the distance measurement start trigger signal TR2 from the processor 21, the control unit 71 enters a state of waiting for the first distance measurement signals from the device 1 in the automobile C.

Next, the transmission unit 42 will be described. The transmission unit 42 is an analog circuit including a DAC 81, an LPF 82, a modulator (MOD) 83, and an amplifier 84.

The DAC 81 receives digital data for a continuous wave (CW) from the digital unit 41, and converts the received digital data into an analog signal. Therefore, the digital unit 81 generates the digital data for the continuous wave (CW).

The analog signal from the DAC 81 is inputted to the modulator 83 after passing through the LPF 82. The modulator 83 frequency-modulates an output signal of the LPF 82 according to a frequency switching signal from the control unit 71. The analog signal from the LPF 82 is modulated into a signal having either one of the above-described frequencies f1 and f2.

The modulator 83 modulates an input signal according to the frequency switching signal from the control unit 71, and generates a signal having either one of the frequencies f1 and f2.

The amplifier 84 is a power amplifier, and amplifies an output signal of the modulator 83 and feeds the amplified output signal to the antenna 44 via the antenna switch 45. The antenna switch 45 operates to connect the antenna 44 to the transmission unit 42 or the receiving unit 43 according to an antenna control signal from the control unit 71.

Next, the receiving unit 43 will be described. The receiving unit 43 is an analog circuit including a low-noise amplifier (hereinafter abbreviated as an LNA) 85, a demodulator (DEMOD) 86, an LPF 87, and an analog-to-digital converter (hereinafter abbreviated as an ADC) 88.

The LNA 85 amplifies a received signal from the antenna 44 received via the antenna switch 45, and outputs the amplified received signal to the demodulator 86. The demodulator 86 demodulates an output signal of the LNA 85 according to the frequency switching signal from the control unit 71, and outputs a baseband signal.

An output signal of the demodulator 86 is fed to the ADC 88 via the LPF 87. The ADC 88 converts an output signal of the LPF 87 into a digital signal, and outputs the digital signal to the digital unit 41.

As described above, the transmission unit 42 and the receiving unit 43 constitute a second transmitter/receiver configured to transmit the two second distance measurement signals as the two second carrier signals and receive the two first distance measurement signals as the two first carrier signals from the device 1. using an output of the reference oscillator 70.

(Function)

Next, an operation of the above-described distance measurement apparatus will be described.

(1) Case where the Key-Fob K is Outside the Automobile C and an Unlocking Permission is Judged When the processor 11 in the device 1 receives key-fob identification code information corresponding to a transmitted LF signal LF1, the device 1 preforms authentication based on the received key-fob identification code information. When the authentication is correctly performed, the device 1 starts to transmit and receive a plurality of distance measurement signals according to a predetermined sequence.

When transmitting the key-fob identification code information in response to receiving of the LF signal LF1, the device 2 enters a state of waiting for first distance measurement signals from the device 1. Upon receiving the first distance measurement signals from the device 1, the device 2 starts to transmit and receive a plurality of distance measurement signals according to a predetermined sequence.

Each of the device 1 and the device 2 measures respective phases of the received distance measurement signals. The device 2 transmits to the device 1 information about a phase difference PD1 between respective measured two phases of the two first distance measurement signals. The information about the phase difference PD1 is modulated by the modulation unit 75, and is transmitted to the device 1 from the device 2.

The distance measurement operation unit 54 in the device 1 calculates a distance between the device 1 and the device 2 from a phase difference PD2 between two second distance measurement signals measured by the device 1 and the phase difference PD1 between the two first distance measurement signals included in phase difference information received from the device 2, and outputs the calculated distance to the processor 11. Note that distance measurement may be performed a plurality of times, as described above.

If the calculated distance is less than a predetermined distance D1, the processor 11 outputs an unlocking permission signal to a device for controlling locking/unlocking of the door of the automobile C. The predetermined distance D1 is a distance within a range of 2 meters to 8 meters, for example, to which a distance measurement error is added as a margin.

If the calculated distance is the predetermined distance D1 or more, a relay attack may be possibly performed. Accordingly, the processor 11 does not output an unlocking permission signal to the device for controlling locking/unlocking of the door of the automobile C.

The unlocking of the door is controlled based on a distance measurement result, as described above.

(2) Case where the Key-Fob K is Inside the Automobile C and an Engine Startup Permission is Judged After the door of the automobile C is opened by a door unlocking permission, the device 1 transmits an LF signal LF2, and performs authentication processing between the device 1 and the device 2.

In other words, when the processor 11 in the device 1 receives key-fob identification code information corresponding to the transmitted LF signal LF2, the device 1 preforms authentication based on the received key-fob identification code information. When the authentication is correctly performed, the device 1 starts to transmit and receive a plurality of distance measurement signals according to a predetermined sequence.

Figure 8:
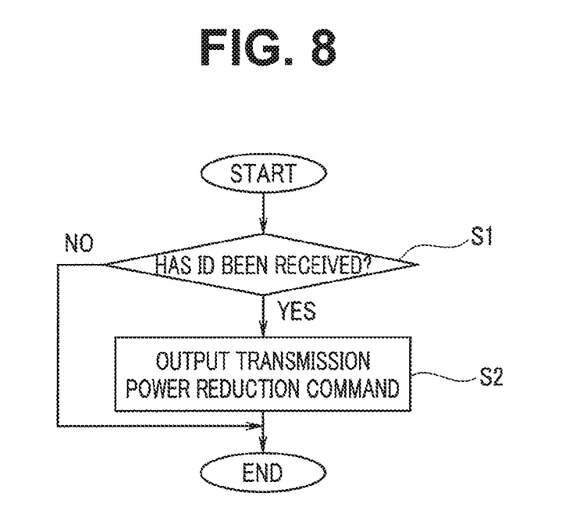
FIG. 8 is a flowchart illustrating an example of a flow of control of respective transmission powers of first distance measurement signals in the processor according to the first embodiment.

FIG. 8 is a flowchart illustrating an example of a flow of control of respective transmission powers of first distance measurement signals in the processor 11. Key-fob identification code information transmitted from the RF transmission unit 23 in the device 2 is ID information of the device 2. Processing illustrated in FIG. 8 is executed in parallel with execution of distance measurement processing inside the automobile.

The processor 11 judges whether or not the key-fob identification code information (i.e., ID information) has been received (step (hereinafter referred to as S)1). When the key-fob identification code information has been received (S1: YES), the processor 11 outputs a transmission power reduction command signal TXP1 for reducing the respective transmission powers of the first distance measurement signals to the control unit 51 in the distance measurement unit 14 (S2). If the key-fob identification code information has not been received (S1: NO), the processor 11 does nothing.

Upon receiving the transmission power reduction command signal TXP1, the control unit 51 outputs a power control signal PC1 to the amplifier 64. Therefore, the respective transmission powers of the first distance measurement signals transmitted from the device 1 are reduced, and a distance that each of the first distance measurement signals reaches is shortened. For example, the transmission power is reduced by 20 dB.

In other words, the respective transmission powers of the first distance measurement signals are lower when an engine startup permission is judged compared to when a door unlocking permission is judged. In other words, in the device 1, transmission powers at which the plurality of first distance measurement signals are respectively transmitted when the key-fob K is inside the automobile C are set to be lower than transmission powers at which the plurality of first distance measurement signals are respectively transmitted when the key-fob K is outside the automobile C.

As described above, when transmitting the key-fob identification code information in response to receiving of the LF signal LF2, the device 2 enters a state of waiting for the first distance measurement signals from the device 1. When receiving the first distance measurement signals from the device 1, the device 2 starts to transmit and receive the plurality of distance measurement signals according to a predetermined sequence.

Since the respective transmission powers of the first distance measurement signals from the device 1 is reduced, when a relay attack has been performed, each of the first distance measurement signals from the device 1 does not reach the device 2. As a result, the device 2 cannot receive each of the first distance measurement signals from the device 1.

However, even if the respective transmission powers of the first distance measurement signals from the device 1 is reduced, the device 2 is inside the automobile C and the device 1 and the device 2 are close to each other if a relay attack has not been performed. Thus, the device 2 can receive each of the first distance measurement signals from the device 1. Therefore, in the device 1 and the device 2, a phase difference between the distance measurement signals received by each of the devices 1 and 2 is calculated. Information about a phase difference PD1 obtained by the device 2 is modulated by the modulation unit 75, and is transmitted to the device 1 from the device 2.

The distance measurement operation unit 54 in the device 1 calculates the distance between the device 1 and the device 2 based on a phase difference PD2 between two second distance measurement signals obtained by the device 1 and the phase difference PD1 between the two first distance measurement signals received from the device 2, and outputs the calculated distance to the processor 11. Note that distance measurement may also be performed a plurality of times inside the automobile.

The processor 11 compares the calculated distance with a predetermined distance D2 as a threshold value, to determine whether or not a startup permission signal is outputted to a device for controlling startup of the engine of the automobile C. At this time, the distance D2 is set in consideration of a degradation in distance measurement accuracy due to a multi-path inside the automobile C.

If there is no multi-path effect, the distance D2 is set to a distance between a position at which the key-fob K can be in a space inside the automobile C and a position of the device 1, for example, several tens of centimeters to 2 meters. However, in the present embodiment, the distance D2 is set to approximately 10 meters larger than a distance D1, for example, in consideration of a degradation in distance measurement accuracy due to a multi-path inside the automobile C. This means that a margin of the distance D2 is increased depending on an increase in error caused by a multi-path. Note that the distance D2 may be set to approximately 2 meters smaller than the distance D1, for example, depending on a level of a degradation in distance measurement accuracy due to a multi-path. This means that the key-fob K is at a shorter distance when the key-fob is inside the automobile compared to when the key-fob K is outside the automobile.

If the calculated distance is less than the predetermined distance D2, the processor 11 outputs a startup permission signal as a predetermined command to the device for controlling startup of the engine of the automobile C.

If the calculated distance is the predetermined distance D2 or more, a relay attack may be possibly performed. Accordingly, the processor 11 does not output a startup permission signal to the device for controlling startup of the engine of the automobile C.

As described above, according to the above-described embodiment, the respective transmission powers of the first distance measurement signals transmitted from the device 1 are reduced inside the automobile C. Accordingly, when a relay attack is performed, the first distance measurement signals do not reach the device 2 so that distance measurement cannot be performed.

Further, the predetermined distance D2 as a threshold value used for judging whether or not the startup permission signal is outputted to the device for controlling startup of the engine of the automobile C is set to several meters, for example. Thus, when a relay attack is not performed, it can be appropriately judged whether or not engine startup is permitted even if there is a multi-path effect.

Note that although the respective transmission powers of the first distance measurement signals from the device 1 are reduced in the above-described embodiment, distance measurement may be unable to be performed in such a manner that the respective transmission powers of the second distance measurement signals from the device 2 are reduced, as a modification.

Figure 9:
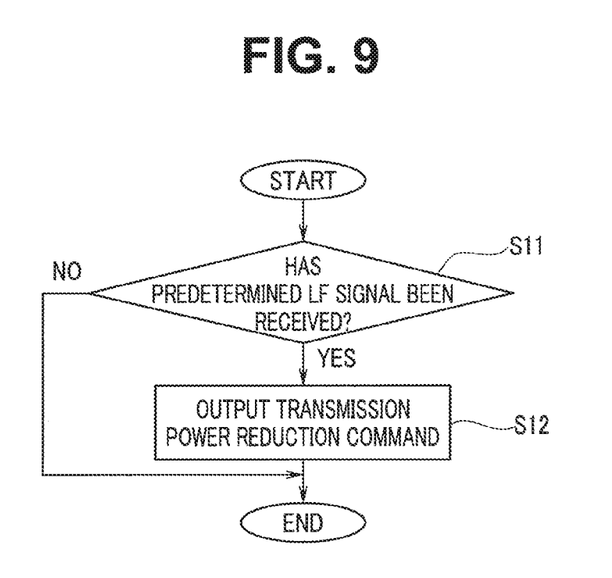
FIG. 9 is a flowchart illustrating an example of a flow of control of respective transmission powers of second distance measurement signals in a processor according to a modification to the first embodiment.

FIG. 9 is a flowchart illustrating an example of a flow of control of respective transmission powers of second distance measurement signals in the processor 21 according to a modification to the first embodiment. When the door has been locked, an LF signal LF2 is always intermittently transmitted from the LF transmission unit 12 in the device 1.

The processor 21 in the device 2 judges whether or not the LF signal LF2 is received (S11). If the LF signal LF2 is received (S11: YES), the processor 21 outputs a transmission power reduction command signal TXP2 for reducing the respective transmission powers of the second distance measurement signals to the control unit 71 in the distance measurement unit 24, as indicated by a dotted line in FIG. 7 (S12). If the LF signal LF2 is not received (S11: NO), the processor 21 does nothing.

When receiving the transmission power reduction command signal TXP2, the control unit 71 outputs a power control signal PC2 to the amplifier 84, as indicated by a dotted line in FIG. 7. The amplifier 84 is connected to the control unit 71, and has a configuration in which an amplification factor can be changed according to the power control signal PC2 from the control unit 71, as with the above-described amplifier 64.

As a result, the respective transmission powers of the second distance measurement signals transmitted from the device 2 are reduced, and a distance that each of the second distance measurement signals reaches is shortened. For example, the transmission power is reduced by 20 dB. Although the device 1 transmits first distance measurement signals in response to receiving of key-fob identification code information, the device 1 cannot receive the second distance measurement signals from the device 2 so that distance measurement cannot be performed.

In other words, the respective transmission powers of the second distance measurement signals are lower when an engine startup permission is judged compared to when a door unlocking permission is judged. In other words, in the device 2, transmission powers at which the plurality of second distance measurement signals are respectively transmitted when the key-fob K is inside the automobile C are set to be lower than transmission powers at which the plurality of second distance measurement signals are respectively transmitted when the key-fob K is outside the automobile C.

Therefore, even in the case where the respective transmission powers of the second distance measurement signals from the device 2 are reduced, a similar effect to the effect in the above-described embodiment can be obtained.

Note that both the processing illustrated in FIG. 8 and processing illustrated in FIG. 9 may be performed. In other words, the device 1 may reduce the respective transmission powers of the first distance measurement signals din response to receiving of the key-fob identification code information from the device 2, and the device 2 may reduce the respective transmission powers of the second distance measurement signals in response to receiving of the LF signal LF2 from the device 1.

Although the respective transmission powers of the first and second distance measurement signals are reduced in the above-described embodiment, a weak radio wave permitted in a law about a radio wave in each country, for example, a weak radio wave that does not need to be licensed by the Minister for Internal Affairs and Communications in Japan may be used as the first and second distance measurement signals low in transmission power.

As described above, according to the above-described embodiment, a distance measurement apparatus capable of appropriately taking a measure against a relay attack can also be implemented under an environment where a distance measurement accuracy degrades.

Second Embodiment

Although in the first embodiment, the respective transmission powers of the distance measurement signals from the device 1 or the device 2 are reduced when distance measurement is performed inside the automobile C in a measure against a relay attack, in a second embodiment, a measure against a relay attack is taken in such a manner that respective received power intensities of distance measurement signals are measured to judge an engine startup permission based on whether or not the received power intensities are a predetermined threshold value or less.

Note that a configuration of a wireless communication system according to the second embodiment is substantially the same as the configuration of the wireless communication system according to the first embodiment, and hence description is omitted for the same components, and only different components will be described.
(Configuration)

Figure 10:
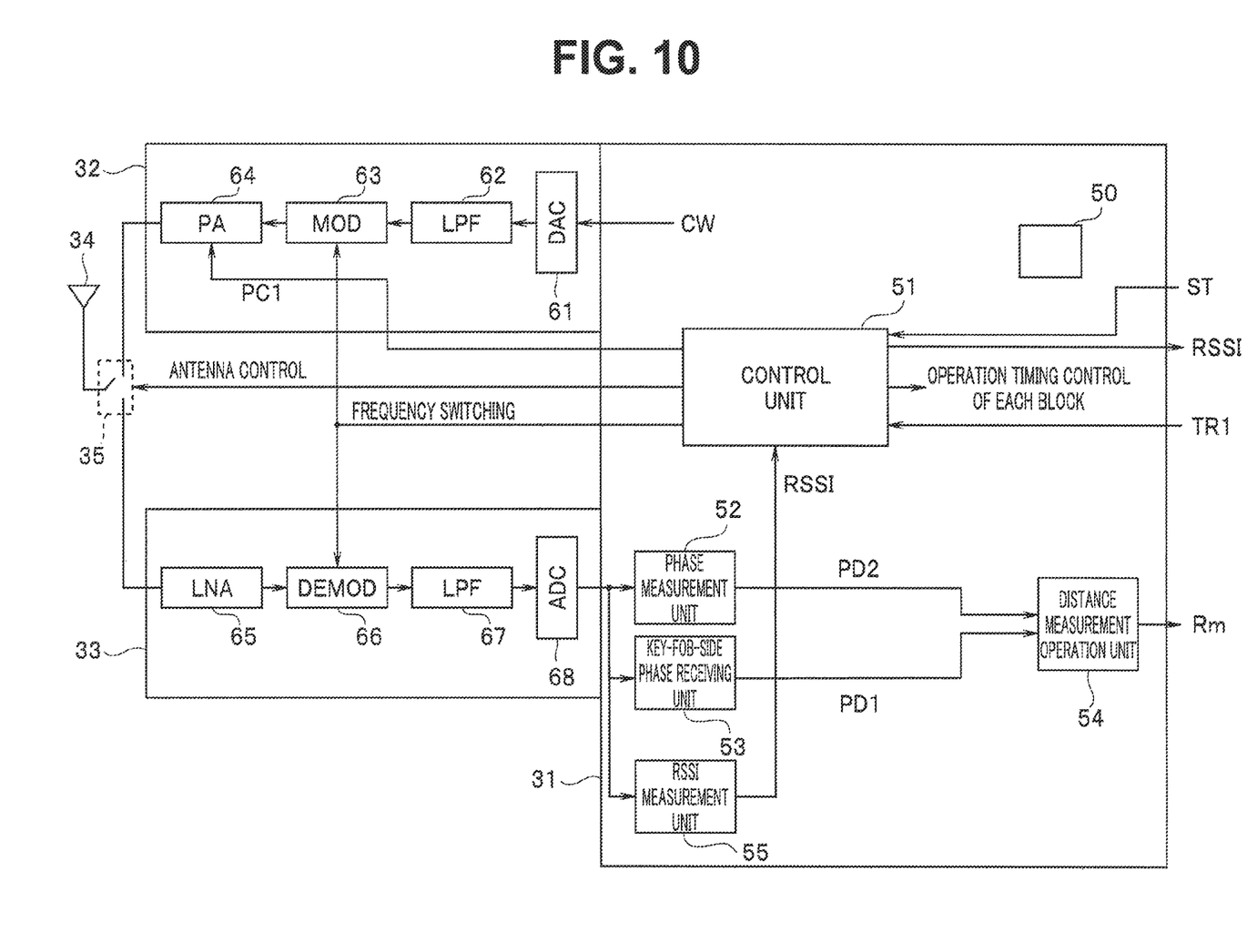
FIG. 10 is a circuit diagram of a distance measurement unit in one of two devices according to a second embodiment.

FIG. 10 is a circuit diagram of a distance measurement unit 14 in a device 1. A configuration illustrated in FIG. 10 differs from a configuration illustrated in FIG. 6 in that a digital unit 31 includes a received signal strength indicator (RSSI) measurement unit 55. The received signal strength indicator (RSSI) measurement unit 55 measures, from received powers of received second distance measurement signals, respectively, received signal strength indicators (hereinafter referred to as RSSIs) of the second distance measurement signals, and outputs information about the respective RSSIs of the second distance measurement signals measured by the device 1 to a control unit 51. Therefore, the RSSI measurement unit 55 constitutes a received signal intensity measurement unit configured to measure the respective RSSIs of the second distance measurement signals from the device 2.

The control unit 51 can hold the information about the respective RSSIs (hereinafter referred to as RSSI information) of the second distance measurement signals measured in the RSSI measurement unit 55, and the processor 11 can read out the RSSI information in the control unit 51.
(Function)

Next, an operation of the above-described distance measurement apparatus will be described.
(1) Case where the Key-Fob K is Outside the Automobile C and an Unlocking Permission is Judged If the key-fob K is outside the automobile C, and an unlocking permission is judged, the same operation as the operation described in the first embodiment is performed by a processor 11 in the device 1 and a processor 21 in the device 2.
(2) Case where the Key-Fob K is Inside the Automobile C and an Engine Startup Permission is Judged After the automobile C is permitted to unlock a door and the door is opened, the device 1 transmits an LF signal LF2, and authentication processing between the device 1 and the device 2 is performed.

In other words, when the processor 11 in the device 1 receives key-fob identification code information corresponding to the transmitted LF signal LF2, the device 1 preforms authentication based on the received key-fob identification code information. When the authentication is correctly performed, the device 1 and the device 2 each start transmission and receiving processing of a plurality of distance measurement signals according to a predetermined sequence.

Figure 11:
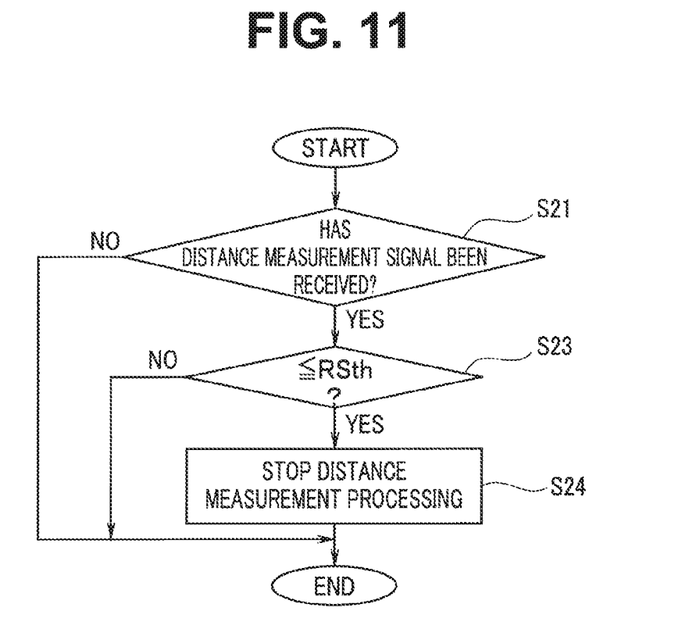
FIG. 11 is a flowchart illustrating an example of a flow of processing for judging stop of distance measurement processing in a processor according to the second embodiment.

FIG. 11 is a flowchart illustrating an example of a flow of processing for judging stop of distance measurement processing in the processor 11. The processing illustrated in FIG. 11 is executed in parallel with execution of distance measurement processing inside the automobile.

The processor 11 in the device 1 transmits first distance measurement signals after authentication has been correctly performed based on the key-fob identification code information. Then, the processor 11 monitors whether or not second distance measurement signals from the device 2 have been received in the distance measurement unit 14.

In the processor 11, distance measurement processing is started, and the processing illustrated in FIG. 11 is then performed. It is judged whether or not the second distance measurement signals have been received from the device 2 in the distance measurement unit 14 (S21). If the second distance measurement signals are not received (S21: NO), no processing is performed.

When the second distance measurement signals are received (S21: YES), the processor 11 reads out RSSI information of the received second distance measurement signals from the control unit 51, and judges whether or not the read RSSIs are a predetermined threshold value RSth or less (S23).

When the RSSI information exceeds the predetermined threshold value RSth (S23: NO), no processing is performed. When the RSSI information is the predetermined threshold value RSth or less (S23: YES), the processor 11 stops the distance measurement processing (S24). The distance measurement processing is stopped by the processor 11 feeding a distance measurement processing stop command ST to the control unit 51 in the distance measurement unit 14. As a result, the processor 11 causes a distance measurement operation unit 54 not to calculate a distance Rm. Therefore, the processor 11 constitutes a judgment unit configured to judge whether or not the distance Rm can be calculated based on the RSSI information. The processor 11 judges that the distance is not calculated when the RSSIs measured by the RSSI measurement unit 55 are the predetermined threshold value RSth or less.

The distance measurement unit 14 stops the distance measurement processing upon receiving the stop command. As a result, the distance measurement unit 14 cannot perform distance measurement. Accordingly, the processor 11 cannot obtain a distance measurement result.

In other words, when the respective RSSIs of the second distance measurement signals are the predetermined threshold value RSth or less, a relay attack may be possibly performed so that distance measurement is not performed.

Therefore, according to the above-described second embodiment, when the respective RSSIs of the second distance measurement signals transmitted from the device 2 inside the automobile C are the predetermined threshold value RSth or less, the distance measurement processing is stopped. Accordingly, when a relay attack is performed, distance measurement cannot be performed.

Note that although it is judged that the respective RSSIs of the second distance measurement signals from the device 2 are the predetermined threshold value RSth or less in the device 1 in the above-described embodiment, to judge stop of the distance measurement processing, it may be judged whether or not respective RSSIs of the first distance measurement signals from the device 1 are the predetermined threshold value RSth or less in the device 2 to judge stop of the distance measurement processing so that distance measurement cannot be performed.

Figure 12:
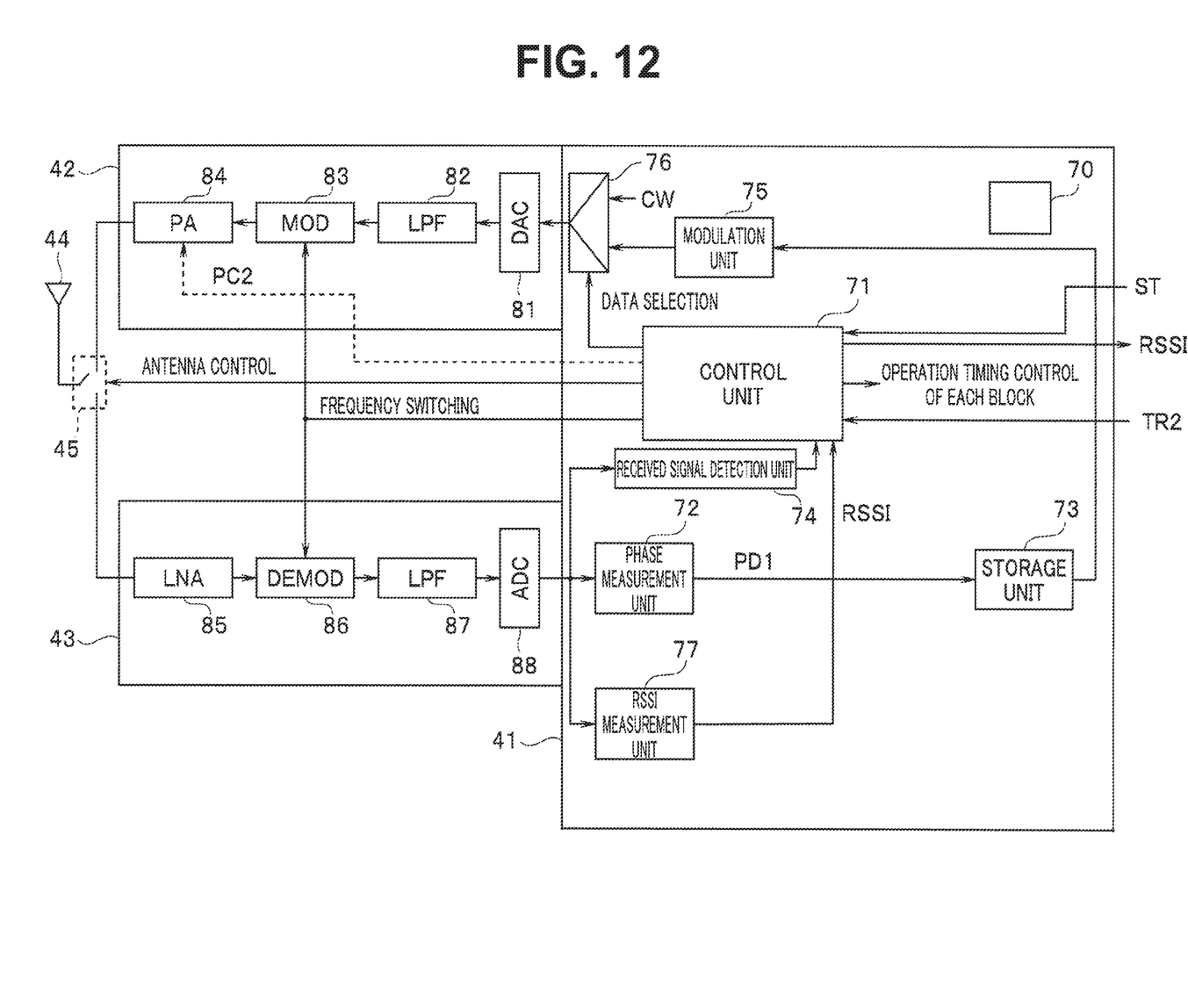
FIG. 12 is a circuit diagram of a distance measurement unit in the other of the two devices according to a modification to the second embodiment.

In the case, a distance measurement unit 24 in the device 2 is as illustrated in FIG. 12. FIG. 12 is a circuit diagram of the distance measurement unit 24 in the device 2 according to a modification to the second embodiment. A configuration illustrated in FIG. 12 differs from a configuration illustrated in FIG. 7 in that a digital unit 41 includes a received signal strength indicator measurement unit (hereinafter referred to as an RSSI measurement unit) 77. The RSSI measurement unit 77 measures, from received powers of received first distance measurement signals, respectively, RSSIs of the first distance measurement signals, and outputs information about the respective RSSIs of the first distance measurement signals measured by the device 2 to a control unit 71. Therefore, the RSSI measurement unit 77 constitutes a received signal strength indicator measurement unit configured to measure the respective RSSIs of the first distance measurement signals from the device 1.

The control unit 71 can hold the information about the respective RSSIs of the first distance measurement signals measured in the RSSI measurement unit 77, and a processor 21 can read out the RSSI information in the control unit 71.

Processing for judging stop of distance measurement processing in the processor 21 is similar to the processing illustrated in FIG. 11. In other words, the processor 21 enters a state of waiting for the first distance measurement signals after transmitting key-fob identification code information. In the state, when the processor 21 receives the first distance measurement signals (S21: YES), the processor 21 stops the distance measurement processing (S24) when the RSSIs measured in the RSSI measurement unit 77 are the predetermined threshold value RSth or less (S23: YES). The distance measurement processing is stopped by the processor 21 feeding a distance measurement processing stop command ST to the control unit 71 in the distance measurement unit 24. Since distance measurement processing is stopped, second distance measurement signals are not transmitted so that distance measurement cannot be performed. Therefore, the processor 21 constitutes a judgment unit configured to judge whether or not a distance Rm can be calculated based on the RSSI information. The processor 21 judges that the distance is not calculated when the RSSIs measured by the RSSI measurement unit 77 are the predetermined threshold value RSth or less.

Note that the threshold value RSth in the device 1 in the above-described second embodiment and the threshold value RSth in the device 2 in the modification may differ from each other.

Although in the above-described second embodiment, the RSSI of the second distance measurement signal first received after the first distance measurement signals are transmitted and the threshold value RSth are compared with each other in the device 1 or the RSSI of the first distance measurement signal first received and the threshold value RSth are compared with each other in the device 2, a sum or an average value of the respective two RSSIs of the two second distance measurement signals and the predetermined threshold value RSth may be compared with each other in the device 1 or a sum or an average value of the respective two RSSIs of the two first distance measurement signals and the predetermined threshold value RSth may be compared with each other in the device 2.

As described above, according to the above-described two embodiments and modifications, there can be provided a distance measurement apparatus capable of also appropriately taking a measure against a relay attack even under an environment where a distance measurement accuracy degrades.

Note that although in the above-described two embodiments and modifications, the measured distance Rm between the device 1 and the device 2 obtained as a result of distance measurement processing is compared with predetermined distances D1 and D2 as threshold values, respectively, in judgment of a door unlocking permission and judgment of an engine startup permission, the distances D1 and D2 are set to values different from each other. In other words, the distances D1 and D2 as the predetermined threshold values differ depending on whether the key-fob K is outside the automobile C or inside the automobile C.

The distance D2 is set larger than the distance D1 as a threshold value of a distance between the device 1 generally assumed and a device 2 outside the automobile C when the engine startup permission is judged in consideration of a multi-path effect, as described above. In other words, the distance D2 as a predetermined threshold value when the key-fob K is inside the automobile C is larger than the distance D1 as a predetermined threshold value when the key-fob K is outside the automobile C. However, the distance D2 may be set smaller than the distance between the device 1 in the automobile C generally assumed and the device 2 in consideration of a structure of the automobile C, for example.

Note that although in each of the above-described embodiments, distance measurement processing inside the automobile C is started based on presence or absence of the LF signal LF2 from the device 1 in the automobile C, distance measurement processing in the automobile C may be started depending on whether or not the door of the automobile C is opened.

Although the above-described respective functions of the processor 11 in the device 1 and the processor 21 in the device 2 are implemented by a software program, the functions may be configured as a circuit block in an electronic circuit or an integrated circuit such as an FPGA (field programmable gate array).

While certain embodiments have been described, these embodiments have been presented by way of example only, and are not intended to limit the scope of the inventions. Indeed, the novel devices described herein may be embodied in a variety of other forms; furthermore, various omissions, substitutions and changes in the form of the devices described herein may be made without departing from the spirit of the inventions. The accompanying claims and their equivalents are intended to cover such forms or modifications as would fall within the scope and spirit of the inventions.

What is claimed is:

1. A distance measurement apparatus that calculates a distance between a vehicle and a key-fob based on carrier phase detection, the distance measurement apparatus comprising:

a calculation unit configured to calculate, based on phase information acquired by a first device and a second device at least one of which is movable, a distance between the first device and the second device, wherein the first device provided in the vehicle comprises a first reference signal source, and a first transmitter/receiver configured to transmit a plurality of first distance measurement signals, respectively, as carrier signals and receive a plurality of second distance measurement signals from the second device, respectively, as carrier signals, using an output of the first reference signal source, the second device provided in the key-fob comprises a second reference signal source configured to operate independently of the first reference signal source, and a second transmitter/receiver configured to transmit the plurality of second distance measurement signals and receive the plurality of first distance measurement signals using an output of the second reference signal source, the calculation unit calculates the distance using a detection result of respective phases of the carrier signals obtained by receiving each of the plurality of first distance measurement signals and each of the plurality of second distance measurement signals, and when an engine startup permission of the vehicle is judged, a second transmission power at which the plurality of first distance measurement signals or the plurality of second distance measurement signals are respectively transmitted when the key-fob is inside the vehicle is set to be lower than a first transmission power at which the plurality of first distance measurement signals or the plurality of second distance measurement signals are respectively transmitted when the key-fob is outside the vehicle in at least one of the first device and the second device.

2. The distance measurement apparatus according to claim 1, further comprising a processor provided in the first device and configured to output a predetermined command for the vehicle when the distance (Rm) calculated by the calculation unit is less than a predetermined threshold value.

3. The distance measurement apparatus according to claim 2, wherein the predetermined threshold value differs depending on whether the key-fob is outside the vehicle or inside the vehicle.

4. The distance measurement apparatus according to claim 3, wherein the predetermined threshold value is larger when the key-fob is inside the vehicle compared to when the key-fob is outside the vehicle.

5. The distance measurement apparatus according to claim 1, wherein the plurality of first distance measurement signals or the plurality of second distance measurement signals transmitted by the second transmission power are each a weak radio wave.

* * * * *